United States Patent [19]

Saldinger

[11] 4,276,490
[45] Jun. 30, 1981

[54] BRUSHLESS DC MOTOR WITH RARE-EARTH MAGNET ROTOR AND SEGMENTED STATOR

[75] Inventor: Neil N. Saldinger, Woodland Hills, Calif.

[73] Assignee: Vernitron Corporation, Long Island City, N.Y.

[21] Appl. No.: 69,714

[22] Filed: Aug. 27, 1979

Related U.S. Application Data

[63] Continuation-in-part of Ser. No. 861,117, Dec. 16, 1977, abandoned.

[51] Int. Cl.³ .................. H02K 19/26; H02K 1/18
[52] U.S. Cl. .................... 310/184; 310/156; 310/218; 310/254
[58] Field of Search ............ 310/218, 156, 254, 168, 310/162, 163, 49 R, 67, 180, 194, 184–188; 318/138, 254, 439

[56] References Cited

U.S. PATENT DOCUMENTS

| | | | |
|---|---|---|---|
| 2,993,134 | 7/1961 | Harvey | 310/218 X |
| 3,072,813 | 1/1963 | Reijnst et al. | 310/156 |
| 3,237,034 | 2/1966 | Krasnow | 310/156 X |
| 3,344,325 | 9/1967 | Sklaroff | 310/156 X |
| 3,452,229 | 6/1969 | Pimlott et al. | 310/156 X |
| 3,454,857 | 7/1969 | Farrand et al. | 310/254 X |
| 3,586,942 | 6/1971 | McMahan | 310/156 X |
| 3,859,549 | 1/1975 | Boesel | 310/218 |

*Primary Examiner*—Mark O. Budd
*Attorney, Agent, or Firm*—Freilich, Hornbaker, Wasserman, Rosen & Fernandez

[57] ABSTRACT

A brushless DC motor is provided comprised of a steel ring rotor on which rare-earth magnets are fastened and a segmented stator having a comb-like core for each segment that extends at each end beyond its support structure so phase windings in slots in those extended ends can be provided to the same extent as for all other slots in the comb-like segment, thereby producing substantially the same torque on the rotor over the extended ends as over the central portion of the stator segment. Due to their high coercivity, the rare-earth magnets can operate into air circuits between stator segments without demagnetization, returning to their high flux levels upon re-entering a stator segment.

4 Claims, 8 Drawing Figures

BRUSHLESS DC MOTOR WITH RARE-EARTH MAGNET ROTOR AND SEGMENTED STATOR

BACKGROUND OF THE INVENTION

This is a continuation-in-part of application Ser. No. 861,117 filed Dec. 16, 1977, now abandoned.

The invention relates to DC motors, and more particularly to brushless DC motors.

DC motors commonly use brushes and a commutator to properly distribute current through the windings as the motor rotates. In a brushless DC motor this mechanical switching is replaced with electronic switching. These brushless DC motors are not simply AC motors powered by an inverter but have position feedback of some kind so that the input waveforms are kept in proper phase with the rotor position. The performance of these brushless DC motors is close to that of mechanically commutated DC motors and, when supplied with the proper electronic phase control system, can be substituted directly.

Brushless DC motors have several advantages: they may be operated at much higher speeds, and at full torque at those speeds; the stator may be mounted in a substantial heat sink; there is no EMI which is normally encountered with brushes; and problems of brush wear, arcing and the like are obviated. In construction, a brushless DC motor consists of a stator comprised of an assembly of steel pole pieces and two or more phase windings, and a rotor comprised of an assembly of permanent magnets supported on a shaft so that it may rotate under the influence of the rotating magnetic field set up by the stator under control of an electronic commutating (switching) assembly in response to signals from a rotor position sensor.

In the past, the stator has been constructed as a steel ring with machined slots shaped to receive the phase windings and provide the pole pieces with suitably formed faces. A problem with such a stator construction has been that any failure of a field winding requires removal of the entire stator, i.e., complete axial disassembly of rotating mechanism, requiring large field equipment and significant down time. It would be desireable to segment the stator so that only a fraction of the full stator need be handled at any one time. The cost of producing and mounting the stator would then be less. In many systems failure of a single segment causes only a reduction of system performance. It is therefore advantageous to segment the stator, but this creates a discontinuity in the stator such that slots on the ends receive less than the total number of phase windings. The result is that poles at the end are at about half the strength of poles in the central portion of the segment. Torque on the rotor is thus not uniform throughout the full segment. Accordingly, an object of the invention is to provide a segmented stator for a brushless DC motor having substantially uniform pole strength throughout the full length of each segment.

SUMMARY OF THE INVENTION

In accordance with the invention, a segmented multiphase stator is provided in a brushless DC motor with each slotted segment having a portion at each end extending beyond its support structure, and having phase windings in slots in those end portions for the same number of phases as in slots in the central portion of the segment, thereby to provide uniform pole strength over the full length of the segment, i.e., to provide substantially uniform torque on the rotor over the full length of each segment. The rotor is comprised of rare-earth magnets supported on a ferromagnetic ring mounted on a shaft with bearings so that it may rotate in response to the magnetic field established by the stator. Due to the high coercivity of rare-earth magnets, the magnets can operate into an air circuit between stator segments without significant demagnetization. They return to their high flux levels upon re-entering the flux circuit of the stator segments.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
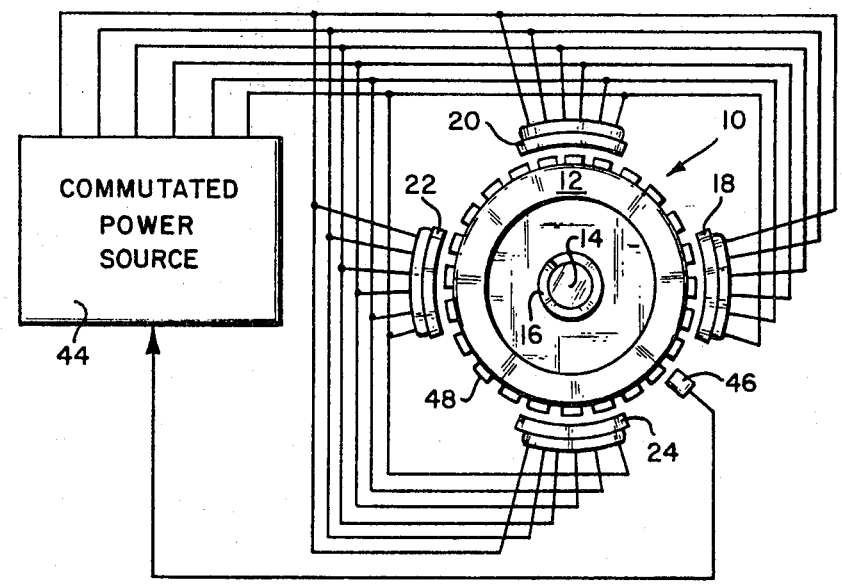
FIG. 1 is a schematic diagram of a brushless DC motor embodying the present invention.

Referring now to FIG. 1, a rotor 10 of a brushless DC motor is comprised of a steel ring 12 mounted on a shaft 14 with bearings 16 so that it may rotate in response to a magnetic field provided by a stator disposed about the rotor in four segments 18, 20, 22 and 24. Each segment extends 45° about the rotor, so that in theory as many as eight segments may be placed around the rotor, although in practice only two, four or six 45° segments may be employed. An even number of segments is chosen so that the attracting forces of the segments acting on the rotor will always be balanced about the rotor axis.

Figure 2:
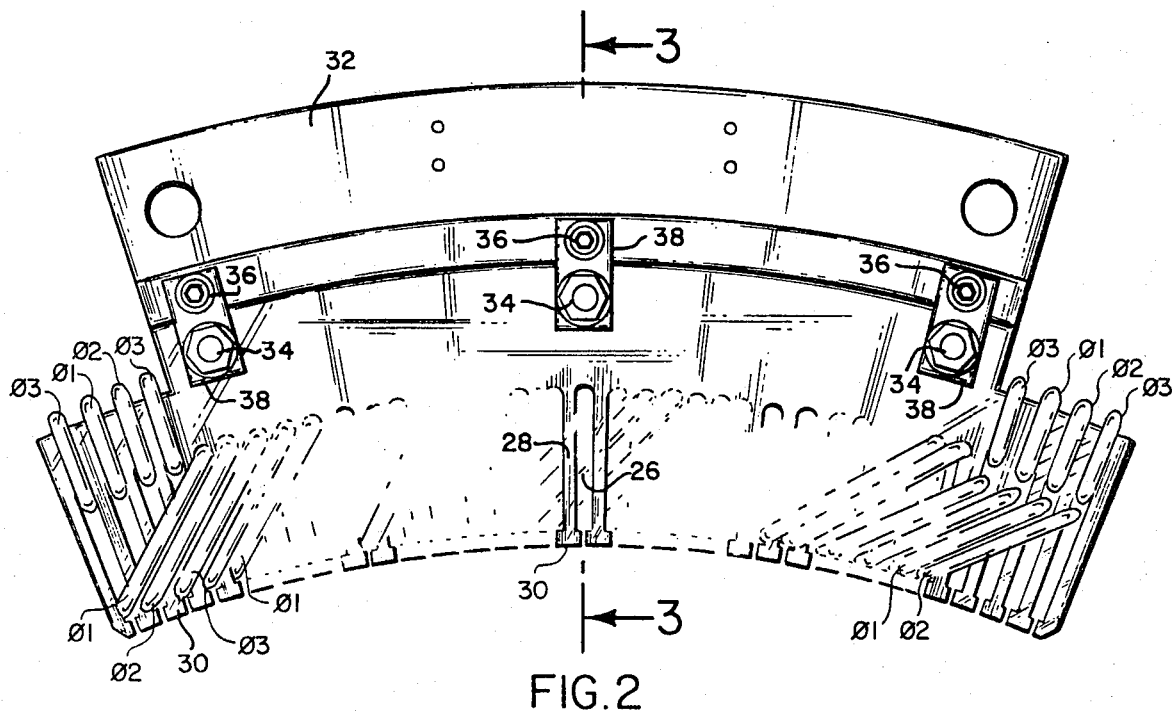
FIG. 2 is a plan view of the comb-like structure for a segment in the segmented stator of the motor of FIG. 1 showing schematically how the same number of phase windings are provided over end portions as over the central portion of the segment.
Figure 3:
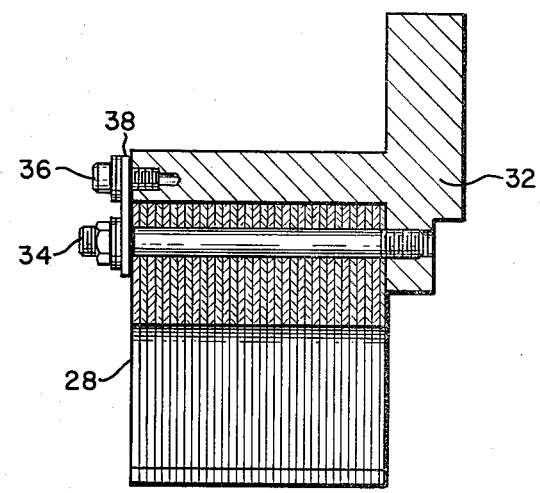
FIG. 3 is a sectional view taken along a line 3—3 in FIG. 2.

Each segment is constructed like a comb with thirty-three slots 26 and thirty-four teeth 28 as shown in FIG. 2 which illustrates a structure 20' for the segment 20. The ends of the teeth are shaped to provide pole faces 30 which altogether span precisely 45°. The end teeth are formed with the same width as the other teeth, but only half the pole face width. Consequently, the comb structure of the segment does span slightly more than 45° by about the width of one tooth. The comb structure is made of laminated steel with a thickness about equal to the length of the comb teeth as shown in FIG. 3. The laminations are secured to an aluminum casting 32 by bolts 34 and 36, and a clamp 38.

The thirty-three slots are used to so wind the comb structure as to provide a 3-phase segment in a conventional manner, except that in order for the slots in the end portions to have the same number of phase windings as all other slots, thereby to produce a more uniform field strength at the pole faces of the teeth at the ends of the segment, the comb-like segment is made to extend beyond its support structure at each end in order for phase windings to be added to the end slots such that each of the teeth is wound with four coils driven by 120° phased amplifiers 1, 2 and 3 (FIG. 6) in open delta connection.

Each of the coils for the three phases is wound over four successive teeth as shown in FIG. 2 such that coil of phase $\phi_1$ on the left is wound around four adjacent teeth starting with the first, while the coil of the phase $\phi_2$ is wound around the four adjacent teeth starting with the second, and the coil of the phase $\phi_3$ is wound around the four adjacent teeth starting with the third. The pattern repeats itself throughout the length of the comb-like segment to provide eight pole groups of four poles per group. But to complete the symmetry to the end, the phase of the coil following a phase $\phi_2$ coil on the right should be a phase $\phi_3$, which is added up at the crotch of the slot and wound directly over the back of the comb, thus providing flux to the remaining teeth as though wound around them. The last three slots then have coils of respective phases $\phi_1$, $\phi_2$, and $\phi_3$, completing the structure on the right. Then on the left, the structure is completed in a strictly analogous way, as shown in FIG. 2.

Figure 4:
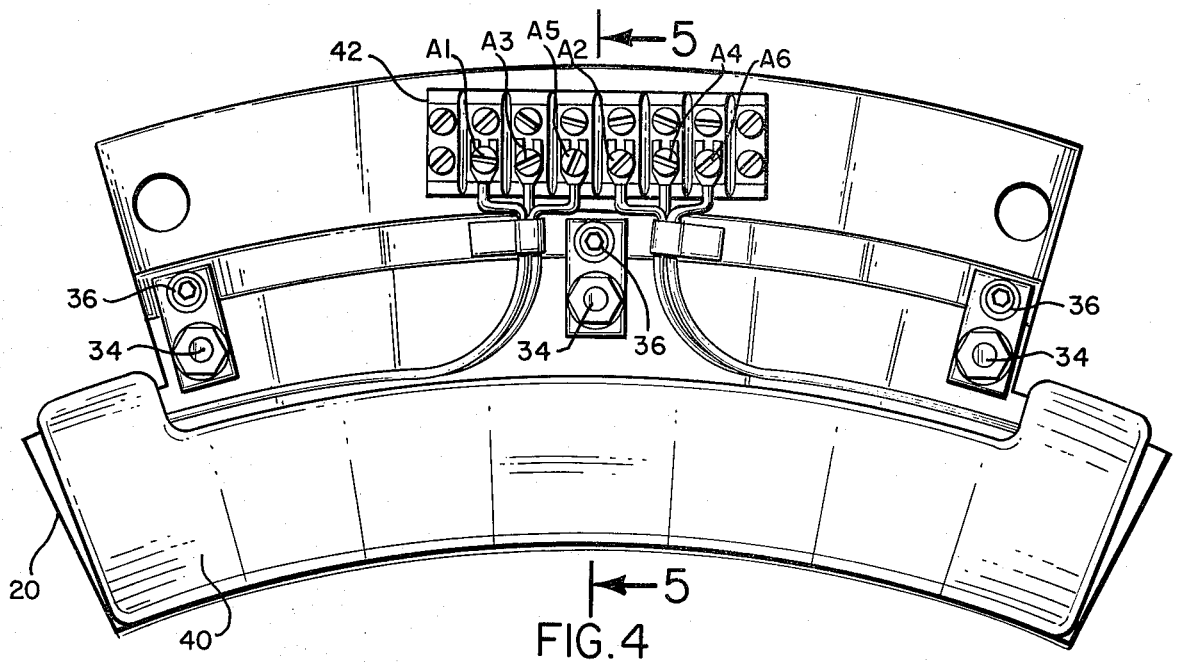
FIG. 4 is a plan view of a segment in the segmented stator of the motor in FIG. 1 corresponding to FIG. 2 with all field windings provided and covered.
Figure 5:
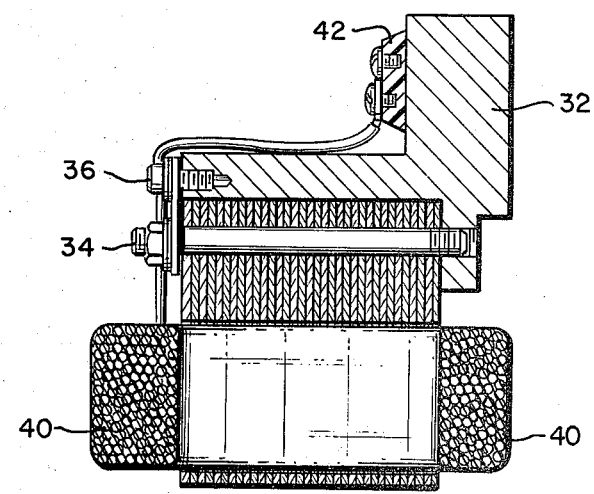
FIG. 5 is a sectional view taken along a line 5—5 in FIG. 4.
Figure 6:
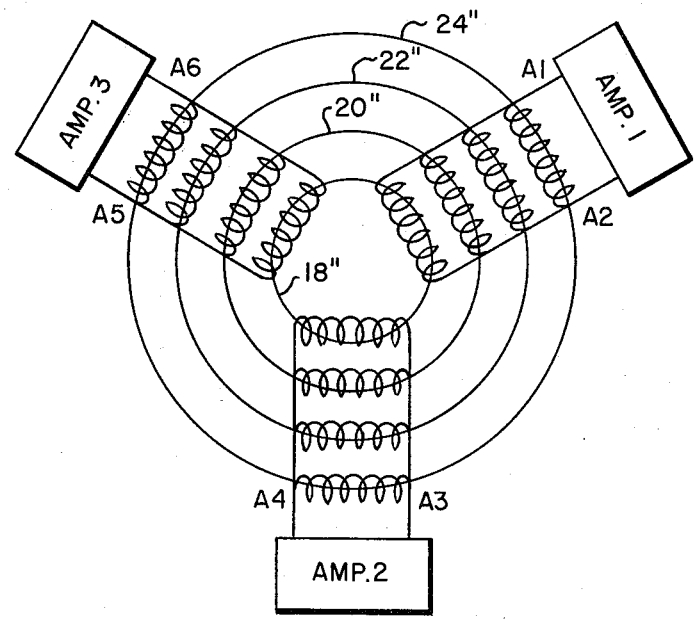
FIG. 6 is a schematic diagram of field windings for the segmented stator of FIG. 1.

FIGS. 4 and 5 illustrate the plan and sectional view of the comb-like structure of FIGS. 2 and 3 with the field windings 40 applied and covered with insulation material. The three field windings for the segment 20 are connected to a terminal block 42 in order for them to be connected to the separate power amplifiers Nos. 1, 2 and 3 as shown in FIG. 6 wherein the dotted-line circle 20″ represents the comb structure for the segment 20. The dotted-line circles 18″, 22″ and 24″ represent the comb structures for the segments 18, 22 and 24 similarly wound. The amplifiers for driving the field windings 40 are the output stages of a commutated power source 44 (FIG. 1). Those amplifiers operate in 120° phase staggered relationship in the open delta connection shown in FIG. 6.

In order to properly commutate the motor, it is necessary to divide its rotation into a number of zones, and to sense the position of the rotor 10. That may be accomplished, for example, by using a sensor 46 to sense the rare-earth magnets 48 fastened on the steel ring 12 of the rotor. The magnets thus sensed may be counted from an index position. The on-off cycle and polarity of the output of each amplifier is controlled by the position of the rotor as determined from the magnet count. Another possibility for exciting the field windings of the stator in proper phase is to use only one power amplifier for the servo control, and to provide four 2-phase bipolar switches to route the power to the proper parallel connected windings. In either case, each segment can be independently excited.

Figure 7:
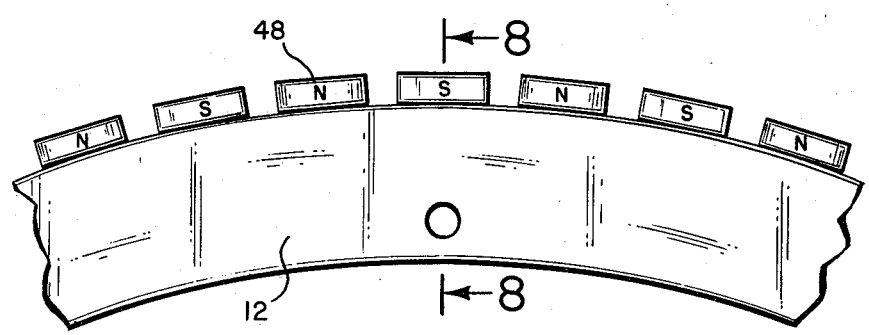
FIG. 7 is a plan view of a section of a rotor in the motor of FIG. 1.
Figure 8:
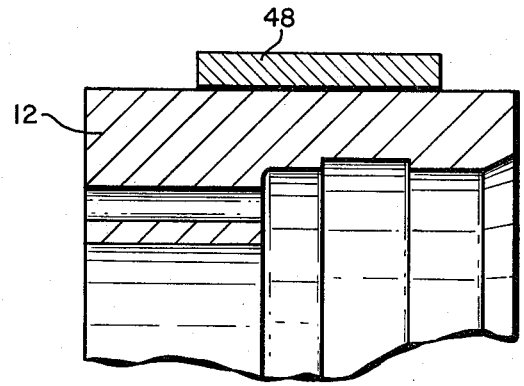
FIG. 8 is a sectional view taken along a line 8—8 in FIG. 7.

How the field windings are excited by the commutated power source 44 is, as just noted, largely a matter of choice to be made by one normally skilled in the art. That is not part of the present invention. What is regarded to be the invention is a segmented stator as just described in a brushless DC motor having a rotor comprised of the steel ring 12 with a plurality of rare-earth magnets 48 fastened to the steel ring as shown in FIGS. 7 and 8. Note that the north-south orientation of the magnets is alternated. The material selected for the magnets is preferably a rare-earth and cobalt intermetallic compound of a type known and referred to in such literature as cited in U.S. Pat. No. 3,979,821. A suitable rare-earth material commerically available is samarium cobalt ($SmCo_5$).

A DC motor constructed as described provides fast acceleration and deceleration for use in such application as a translate/rotate servomotor in a body scanner for tomography. Four stator segments provide high torque for such an application. For higher torque, six segments may be employed, and for lower torque, only two segments need be employed. The use of rare-earth magnets allows the use of a segmented stator because, due to their high coercivity, they can operate into an air circuit between stator segments without significant demagnetization, returning to their high flux levels when re-entering a stator segment. Segmenting the stator makes it easier to handle, install, and repair the stator since only a fraction of the full stator need be handled at any one time. For example, in a motor having a peak torque of 1650 lb-ft and a total weight of 400 lbs for the rotor and stator, the rotor may weight 200 lbs and each of four stator segments 50 lbs. If a full-ring stator were to be employed, the weight of the stator would be more than 200 lbs, a weight too great to handle without a hoist. In that manner, lower costs of manufacture and field service are achieved, in addition to convenience and ease in converting to higher or lower torque requirements by adding or removing segments.

Although particular embodiments of the invention have been described and illustrated herein, it is recognized that modifications and equivalents may readily occur to those skilled in the art. What is claimed is:

1. A segmented multiphase stator in a motor having a permanent magnet rotor, each segment being comprised of a comb-like arcuate core having inwardly extending teeth over its entire arcuate length, and a support structure across the back of said core over less than its entire arcuate length to leave a portion of said core at each end thereof with teeth extending therefrom to provide a plurality of slots through which phase windings may be wound over the unsupported back of said core, said multiphase stator having each of successive phase windings started in successive slots between teeth in a symmetrical repetitive sequential order over the full length of said core, with each phase winding crossing over a plurality of teeth equal to the number of teeth at each end extending from said unsupported back of said core, and turns of successive phase windings wound in slots at each end of said core with one winding in each slot being completed over the unsupported back thereof, whereby teeth at each unsupported back of said core is provided with flux from successive phase windings equal to flux through teeth in the central supported portion of said comb-like core, thereby to complete the symmetry to the ends for a stator having the same number of phase windings for all teeth of said comb-like core for a more uniform field strength at the pole faces of the teeth at the ends thereof.

2. A motor as defined in claim 1 wherein the number of phases is n, where n is greater than 1, and said phases are an equal number of electrical degrees apart, the number of teeth included in each phase winding is at least n, and the number of slots in each of said unsupported ends of said comb-like core is the same as the number of teeth included in each phase winding.

3. A motor as defined in claim 2, wherein said rotor is comprised of a ferromagnetic ring with evenly spaced permanent magnets attached on the periphery of said ring, each magnet being a flat bar, and each bar being made of high coercivity rare-earth material, thereby having a larger air gap over most of the magnet area.

4. A motor as defined in claim 1, 2 or 3 wherein each stator segment is separately disconnectable for continued operation at reduced torque and separately removable for replacement.

* * * * *